United States Patent
Albrecht-Buehler et al.

(10) Patent No.: US 11,585,553 B2
(45) Date of Patent: Feb. 21, 2023

(54) METHOD AND SYSTEM FOR CONTROLLING A USER INTERFACE AND AN AIR-CONDITIONING UNIT

(71) Applicant: Bayerische Motoren Werke Aktiengesellschaft, Munich (DE)

(72) Inventors: Conrad Albrecht-Buehler, Sunnyvale, CA (US); Christian Brey, Fahrenzhausen (DE); Patrick Dahms, Mountain View, CA (US); Daniel Grein, Novato, CA (US); Etienne Iliffe-Moon, Menlo Park, CA (US); Josef Schumann, Munich (DE); Amin Seyed-Ghaemi, Eching (DE); Kristina Stark, Eching (DE); Wei Wang, San Francisco, CA (US); Wolfgang Wolter, Unterschleissheim (DE); Ralph Zipf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/046,992

(22) PCT Filed: Apr. 2, 2019

(86) PCT No.: PCT/EP2019/058235
§ 371 (c)(1),
(2) Date: Oct. 12, 2020

(87) PCT Pub. No.: WO2019/197208
PCT Pub. Date: Oct. 17, 2019

(65) Prior Publication Data
US 2021/0048213 A1    Feb. 18, 2021

(30) Foreign Application Priority Data

Apr. 13, 2018 (DE) .................... 10 2018 205 690.0

(51) Int. Cl.
*F24F 11/50* (2018.01)
*G05B 19/042* (2006.01)

(52) U.S. Cl.
CPC ............ *F24F 11/50* (2018.01); *G05B 19/042* (2013.01); *G05B 2219/2614* (2013.01)

(58) Field of Classification Search
CPC ................... F24F 11/50; G05B 19/042; G05B 2219/2614; B60K 37/06; B60H 1/00985; B60H 1/00964; B60H 1/0065
See application file for complete search history.

(56) References Cited

U.S. PATENT DOCUMENTS

| | | | |
|---|---|---|---|
| 2006/0025874 A1* | 2/2006 | Huffington | G05B 19/104 700/44 |
| 2011/0037725 A1* | 2/2011 | Pryor | G01C 21/3664 345/174 |

(Continued)

FOREIGN PATENT DOCUMENTS

| | | |
|---|---|---|
| DE | 103 01 156 B3 | 9/2004 |
| DE | 10 2009 030 263 A1 | 12/2010 |

(Continued)

OTHER PUBLICATIONS

International Search Report (PCT/ISA/210) issued in PCT Application No. PCT/EP2019/058235 dated Jul. 25, 2019 with English translation (six pages).

(Continued)

*Primary Examiner* — Charles R Kasenge
(74) *Attorney, Agent, or Firm* — Crowell & Moring LLP

(57) ABSTRACT

A method controls a user interface and an air-conditioning unit of a vehicle. The user interface includes display and operating elements. The method displays a plurality of the elements on the user interface, receives at least two operation parameters of the air-conditioning unit, determines one or more display parameters for a first element from the plurality of elements on the basis of the at least two operation parameters, and displays the first element on the basis of the one or more display parameters.

11 Claims, 6 Drawing Sheets

(56) References Cited

U.S. PATENT DOCUMENTS

| | | | | |
|---|---|---|---|---|
| 2011/0082627 | A1* | 4/2011 | Small | B60K 35/00 701/48 |
| 2014/0109080 | A1* | 4/2014 | Ricci | G06F 3/04886 717/174 |
| 2017/0120724 | A1* | 5/2017 | Furse | B60H 1/00985 |
| 2018/0037087 | A1 | 2/2018 | Cengil et al. | |

FOREIGN PATENT DOCUMENTS

| | | |
|---|---|---|
| DE | 10 2012 016 109 A1 | 2/2014 |
| DE | 10 2014 209 247 A1 | 12/2014 |
| DE | 10 2014 204 890 A1 | 9/2015 |
| DE | 10 2014 205 157 A1 | 9/2015 |
| DE | 10 2015 207 975 A1 | 11/2016 |
| DE | 10 2016 114 354 A1 | 2/2018 |
| JP | 2011-251654 A | 12/2011 |

OTHER PUBLICATIONS

German-language Written Opinion (PCT/ISA/237) issued in PCT Application No. PCT/EP2019/058235 dated Jul. 25, 2019 (five pages).

German-language Search Report issued in German Application No. 10 2018 205 690.0 dated Feb. 18, 2019 with partial English translation (13 pages).

Korean-language Office Action issued in Korean Application No. 10-2020-7027534 dated Mar. 31, 2022 with English translation (nine (9) pages).

* cited by examiner

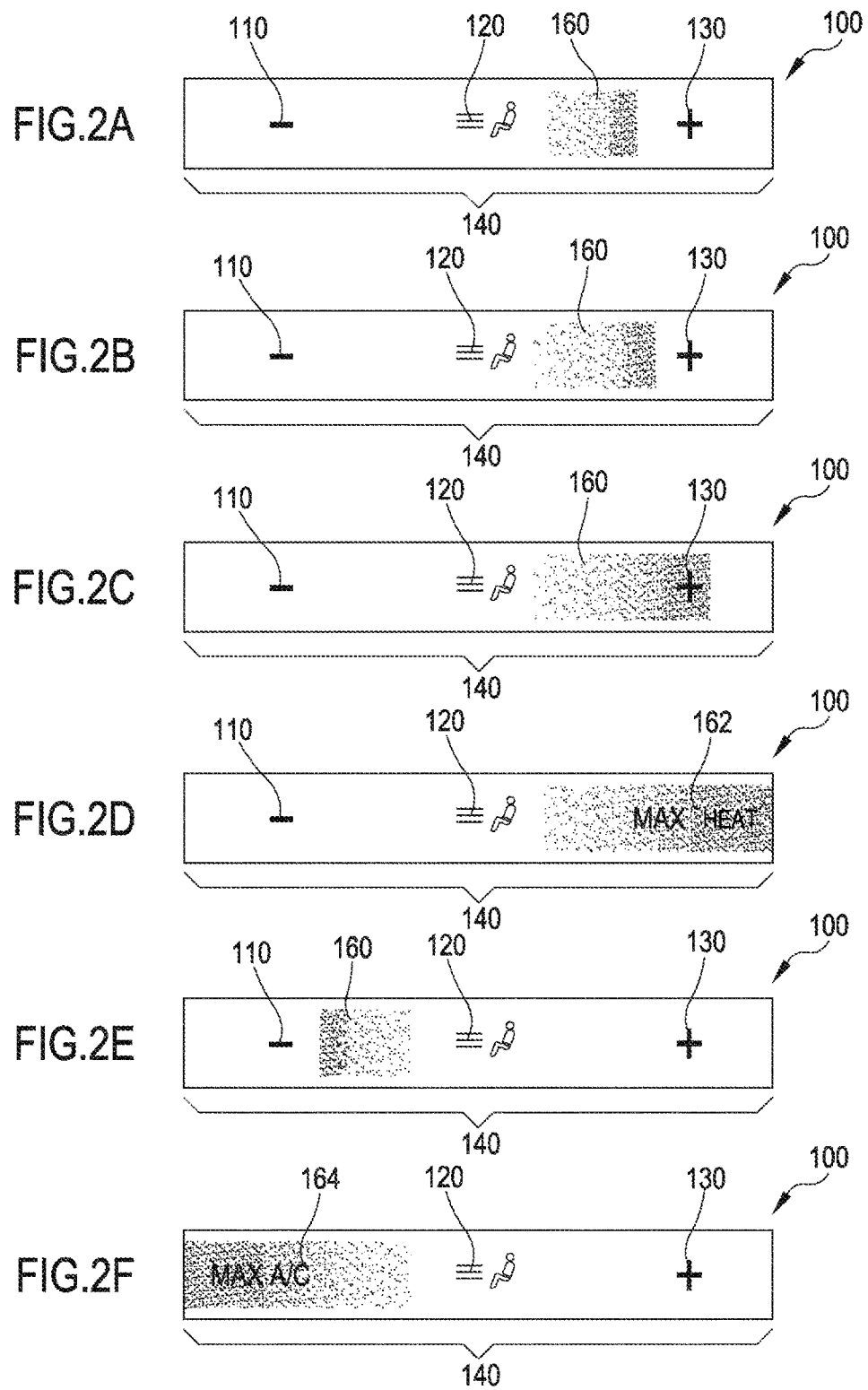

METHOD AND SYSTEM FOR CONTROLLING A USER INTERFACE AND AN AIR-CONDITIONING UNIT

BACKGROUND AND SUMMARY OF THE INVENTION

The disclosure relates to a method and a system for controlling a user interface and an air-conditioning unit in vehicles. The disclosure relates, in particular, to a method and a system for an integrated display and operating concept for the automated control of components in vehicles, for example for the fully automated control of a heating/air-conditioning system in vehicles.

The prior art discloses methods and systems for controlling components which enable manual, partly automatic or fully automatic control of the components in vehicles. By way of example, mention shall be made here of the air-conditioning of the vehicle interior, which can be controlled on the basis of a multiplicity of parameters. The display and operating concepts disclosed here are described below on the basis of practical application to the air-conditioning of a vehicle, but in principle are applicable to a wide variety of areas within and outside the field of (motor) vehicle technology.

The aim of the air-conditioning of a motor vehicle is generally to ensure the occupants' well-being. In this case, air-conditioning that is controlled in an automated manner is becoming increasingly more important vis-à-vis manually controlled air-conditioning. In the case of automated air-conditioning, on the basis of various parameters, for example on the basis of the outside temperature, the setpoint temperature values set by the occupants in the vehicle and the current interior temperature, the temperature of the interior can be regulated so as to give rise to a climate in the vehicle that is pleasant for the occupants.

Traditionally the user has the option of himself/herself manually setting the temperature, the fan and the combination of the air vents, for example, or of predefining suitable settings for (partly) automated regulation. At all events this requires a corresponding number of operating elements for the settings to be implemented in each case. Very recently, mechanical switches, buttons and controllers have increasingly been replaced by corresponding operating elements that are displayed on approach- or touch-sensitive display elements, for example touchscreens. In this case, it has proved difficult to transfer the convenience familiar from mechanical elements with regard to haptics and operability to the operating elements displayed on the display. Mechanical operating elements formerly familiar as rotary or sliding controllers are often being replaced by simple touch controls, which in many cases is perceived as a retrograde step by the user. Set against that are cost savings made possible by the omission of mechanical operating elements.

Over and above the issue regarding the individual configuration of individual operating elements, the aim is to make operational control intuitive, clear and user-friendly. In this case, what has proved to be one of the major influencing factors is how many settings have to be separately set and combined by the user in comparison with functions that can be regulated automatically.

In known systems, outlet temperatures of the ventilation, essentially separately from one another at the top (at the windshield, or "defrost"), in the middle (outlets in the instrument panel) and in the footwell, and also the intensity of the fan can be calculated and regulated automatically by way of a model stored in the system. In order to increase the air-conditioning comfort in the vehicle, it is possible to use further functions such as seat, parking, steering wheel or surface heating and/or ventilation systems. These typically have to be operated manually and are not integrated into the automatic regulation. In this case, the user is required to set a wide variety of heating and/or ventilation elements in concert as much as possible with regard to the desired climate, and possibly to readjust them continuously.

It has been found that users often do not trust the automatic vehicle air-conditioning. By way of example, if a user gets into a vehicle when outside temperatures are very high, said user generally does not set a sensible setpoint temperature of about 21° C., but rather chooses maximum cooling (also "Max AC"), or said user sets the setpoint value to a very low value (e.g. 16° C.). In this case, the user is not aware that the air-conditioning is employing the maximum capacity anyway to reach the temperature set by the user. In the case of this exemplary change in setpoint value, the vehicle cools down after a while and the user has to counteract this actively by means of a further temperature adjustment. This is usually done with a delay after a sensible setpoint temperature has already been significantly undershot. In addition, on account of the high cooling capacity required by the system, the user is often bothered by an increased noise level over a relatively long period of time. Moreover, the air-conditioning capacity available in each case in different states is often not clear to the user. By way of example, without the engine actively running, there are generally no possibilities for cooling or heating. This is not displayed by conventional display and operating systems, however. In many cases it is even suggested that specific setpoint value settings can always be implemented.

This practice is at odds with the purpose of automatic air-conditioning, the aim of which should be that the user has to intervene in the regulation as little as possible. The lack of trust in the air-conditioning system of the vehicle prevents the air-conditioning from being able to work automatically and thus efficiently.

The circumstances mentioned above essentially give rise to a number of potential disadvantages in conventional methods and systems.

The user does not trust the automatic air-conditioning because not enough feedback is given about how the system is currently operating and how rapidly a desired setpoint value will be reached. The user therefore tends to intervene manually in the regulation, which negates the purpose of automatic air-conditioning. As a consequence, the system cannot operate efficiently and does not achieve the best possible air-conditioning convenience. Furthermore, the user is forced to intervene in the automatic system where possible repeatedly or continuously.

Unclear and/or complex operational control, for example caused by virtual operating elements, i.e. operating elements merely displayed graphically on a display, which are arranged in a manner nested in different levels, makes the system unattractive to the user. A simple overview of the range of functions offered by the respective extra equipment is lost. During driving operation, hampered operability may give the consequence, which can additionally distract the user's attention from other tasks.

Additional functions such as seat, steering wheel, surface heating and/or ventilation cannot automatically be included in the regulation, but rather have to be switched on manually by the user. Such additional functions possibly present are often actuatable only in a discrete manner, for example in a maximum of 3 stages. This can hamper an intuitive setting.

For the reasons mentioned above, air-conditioning currently offered can typically indeed be referred to as "automated", but not as "fully automated". Additional convenience functions have to be manually activated/deactivated.

In addition, currently available systems often have further deficiencies. In this regard, there is no possibility of communicating to the system a request for urgency from the user. Moreover, the system cannot provide feedback as to when the desired (predefined) air-conditioning comfort will be attained, or whether the system is already operating at its capacity limits.

Not least owing to the numerous operating elements duplicated for driver and passenger, conventional display and operating concepts appear overloaded and unclear. There is no clear organization that structures individual elements with regard to overall vehicle settings and personal climate zone per occupant.

Context information possibly present is not included in the regulation and vehicle start-up takes place only by way of existing vehicle sensor technology and on the basis of the last user setting. Settings and sensor data from vehicles in the surroundings or other ambient information such as weather data, position of the sun, fine particulate matter pollution and so forth are not currently taken into consideration.

The document DE 103 01 156 B3 describes a device for controlling a heating/air-conditioning system with a mechanical operating element. The operating element has three movement possibilities, each of these movement possibilities being assigned exactly one function of the control of the heating/air-conditioning system. The functions of setting the temperature, setting the amount of air and setting the air distribution are optionally assigned to the movement possibilities. An operating mode of the heating/air-conditioning system cannot be deduced from the switch position.

The document DE 10 2009 030 263 A1 describes an operating method for a menu-based operating and information system of a vehicle. The operational control is based essentially on calling up, from a menu, context-sensitive expansion menus, optionally in a plurality of levels.

Embodiments of the methods and systems disclosed in the present case enable the following advantages.

Methods and systems disclosed in the present case make it possible to strengthen the user's trust through communication between the vehicle and the user by enabling a display proceeding from the actual state through progress until attainment of the desired state by means of an indicator component (also called "indicator"). Said indicator permits feedback with regard to the time requirement, the urgency, the system limits and/or the intensity. Consequently, the user's trust in the automatic regulation is strengthened and manual interventions are minimized and the user's tendency to effect manual interventions is partly or completely reduced. The efficiency of the system can thus be significantly increased and optimized to the greatest possible extent. This is a major advantage particularly in the case of electrically operated vehicles.

Methods and systems disclosed in the present case furthermore provide a user-specific automatic mode. Particular user preferences, such as more intensive use of seat heating, for example, can be taken into account and the automatic regulation can thus be optimized.

Methods and systems disclosed in the present case can furthermore include all enclosing areas available to the air-conditioning (i.e. heating and cooling elements, such as e.g. seat, steering wheel, area heating and seat cooling) in the regulation in line with requirements and in a continuously variable way.

Methods and systems disclosed in the present case can furthermore provide simple or intuitive operational control of the air-conditioning system, as a result of which a greatly reduced user interface is achieved, which enables simpler, more intuitive and elegant operational control by virtue of lower complexity. Input possibilities are reduced to the user's desire for air-conditioning comfort "colder" or "warmer" and to optional communication of a request for urgency if the user desires a particularly rapid adaptation.

Methods and systems disclosed in the present case furthermore provide a clear representation of all available additional functions (seat heating, areas, steering wheel heating, seat ventilation, etc.) included and currently not included in the regulation and the operating state (e.g. intensity) of said additional functions.

Methods and systems disclosed in the present case furthermore provide a particular combination of operating element and state display, thereby enabling a compact and clear display and operator interface.

Methods and systems disclosed in the present case furthermore make it possible to implement the concept without mechanical operating elements.

Methods and systems disclosed in the present case furthermore provide a possibility for organization into overall vehicle settings (menu "central") and personal climate zone per occupant. This allows firstly the reduction of the operating part, and secondly a clearly structured representation of less frequently required functions and/or operating elements.

Methods and systems disclosed in the present case furthermore enable context information possibly present to be taken into consideration. Said information can now be included in the regulation, such that, in addition to the existing vehicle sensor technology and the last user setting, the vehicle start-up can take account of further environmental parameters, such as, for example, settings from vehicles in the surroundings or local weather data.

The overriding aim of the methods and systems disclosed in the present case is to relieve the burden on the user to such an extent that the user regularly has no cause to make manual interventions in the regulation of the heating/air-conditioning system in order to obtain a vehicle at a pleasantly regulated temperature with air-conditioning comfort as desired. Ideally the user gets into the vehicle and the air-conditioning regulation is set to the user's needs in a context-dependent manner and in line with the requirements. The vehicle makes use of all available possibilities in order to establish the desired climate as efficiently as possible. These also include historical data obtained from operational control by the user in the past, and also ambient conditions, extended user data (e.g. living space conditions—networking) and so forth.

The objective of fully automated air-conditioning is to systematically correctly interpret the user's desire for higher or lower temperature regulation and to set and/or regulate the suitable functionalities in an appropriate intensity.

It is an object of the present disclosure to provide methods and systems for an integrated display and operating concept in vehicles, and also vehicles comprising such systems, which avoid one or more of the disadvantages mentioned above and realize one or more of the advantages mentioned above.

This object is achieved by means of the subject matter of the independent claims. Advantageous configurations are specified in the dependent claims.

In accordance with embodiments of the present disclosure, a method for controlling a user interface and an air-conditioning unit of a vehicle is specified. The user interface comprises display and operating elements, which hereinafter are also referred to as "elements" for simplification. The method comprises displaying a multiplicity of the elements on the user interface, receiving at least two operation parameters of the air-conditioning unit, determining one or more display parameters for a first element from the multiplicity of the elements on the basis of the at least two operation parameters, and displaying the first element on the basis of the one or more display parameters.

Preferably, the method further comprises detecting an interaction of a user with a second element from the multiplicity of the elements, determining a control signal on the basis of the interaction of the user, and transmitting the control signal to the air-conditioning unit.

Preferably, the interaction of the user comprises a single or repeated first interaction with the second element, preferably comprising one or more momentary approaches to or single or repeated momentary touching of the user interface in the region of the second element for a duration of up to one second; maintaining a second interaction with the second element, preferably comprising an approach to or tapping of the user interface in the region of the second element for a duration of more than one second; or a third interaction with the second element by means of a relative movement of the user relative to the user interface in the region of the second element, preferably comprising a linear relative movement of a hand or part of a hand of the user in relation to the user interface in the region of the second element, the relative movement comprising an approach to or a touch of the user interface in the region of the second element.

Preferably, the one or more display parameters are selected from the group comprising, preferably consisting of: a coloration and/or color intensity of the element; a position of the element on the user interface; a dimensioning of the element; and/or a shaping of the element.

Preferably, the at least two operation parameters are selected from the group comprising, preferably consisting of: a delivery capacity of a fan; a heating capacity of a heat exchanger for a fan; a driving of a multiplicity of air outlets of a fan; a heating capacity of seat heating; a heating capacity of steering wheel heating; a heating capacity of area heating; and a delivery capacity of seat ventilation.

Preferably, determining the control signal comprises a) adapting one or more operation parameters selected from the group comprising, preferably consisting of: a delivery capacity of a fan; a heating capacity of a heat exchanger for a fan; a driving of a multiplicity of air outlets of a fan; a heating capacity of seat heating; a heating capacity of steering wheel heating; a heating capacity of area heating; and a delivery capacity of seat ventilation; and b) determining the control signal on the basis of the adapted one or more operation parameters.

Preferably, the first element is identical to the second element.

In accordance with embodiments of the present disclosure, a system for controlling a user interface and an air-conditioning unit of a vehicle is specified. The system comprises a control unit and a user interface, wherein the control unit is configured to carry out the method in accordance with the embodiments described here.

Preferably, the system further comprises a display and operating unit configured to display the user interface; wherein the display and operating unit comprises an approach- or touch-sensitive display, the approach- or touch-sensitive display preferably comprising a touchscreen, wherein the touchscreen further preferably operates capacitively.

In accordance with embodiments of the present disclosure, a vehicle is specified, comprising the system in accordance with the embodiments described here.

Exemplary embodiments of the disclosure are illustrated in the figures and are described in greater detail below.

BRIEF DESCRIPTION OF THE DRAWINGS

FIGS. 2A to 2F show an excerpt from the schematic illustration of the user interface from FIG. 2 in accordance with embodiments of the present disclosure.

Hereinafter, unless noted otherwise, identical reference signs are used for identical and identically acting elements.

DETAILED DESCRIPTION OF THE DRAWINGS

Figure 1:
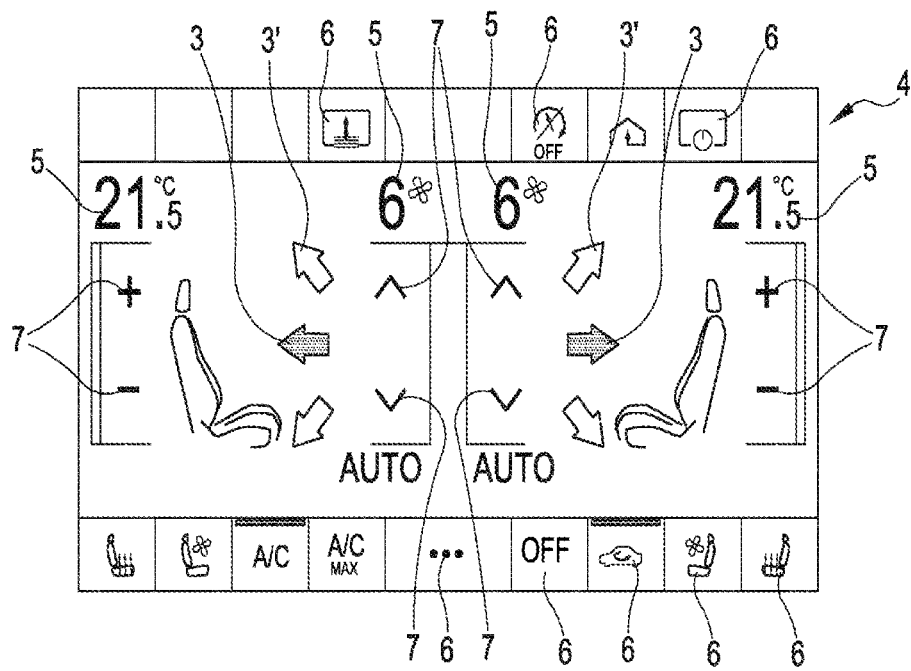
FIG. 1 shows a schematic illustration of a known operator interface from the prior art.

FIG. 1 shows a schematic illustration of a known operator interface 4 from the prior art. The operator interface 4 illustrated is implemented on a touchscreen and shows by way of example a number of known displays and setting options relating to the air-conditioning of a vehicle. Individual or a plurality or all of the elements of the operator interface 4 can also be found as separate elements in the prior art, for example as individual (mechanical) switches or separately embodied displays.

In the case of the operator interface 4, a number of switching elements (e.g. 6, 7), display elements (e.g. 5), and combinations thereof (e.g. 3) find application. Display elements 5 serve only to display information, and not as operating elements. In the present case, display elements 5 on the left and right in FIG. 1 display the setpoint temperature set, and display elements 5 centrally in FIG. 1 display a current intensity of the fan. Switching elements 6 can be found at the upper and lower edges of the operator interface 4 and either switch functions directly (e.g. "A/C" for air-conditioning system on/off) or lead to different views or menu displays (e.g. " . . . "). Switching elements 7 serve for setting specific parameters, for example the setpoint temperature (see "+" and "−" at the left and right edges of FIG. 1) or the intensity of the fan (see "A" and "v" in the middle of FIG. 1).

As described, display elements 5 serve only to display information, while switching elements 6, 7 are provided only for operation as switches. Combined elements, for example elements 3, 3', can combine these functions in so far as information is displayed (e.g. arrows "filled in" or "not filled in") and there is also a switching possibility. In this case, the switched state is displayed at the switching element. In the case of the elements 3, 3', this involves the activation of the ventilation outlets in the middle (see element 3, open) and at the top (see element 3', closed).

As described above, an operator interface as illustrated in FIG. 1 does not enable haptic feedback familiar from mechanical operating elements and requires increased attention on the part of the user owing to the large number and close arrangement of the elements. Blind operation by feeling switches or controllers is not possible; incorrect operation of elements lying close together is possible. Furthermore, an operator interface as illustrated in FIG. 1 does not allow the current operating state of the air-conditioning to be deduced. The extent to which the actual temperature currently differs from the setpoint temperature is not displayed, nor is the current operating state of the air-conditioning indicating whether the system is already heating or cooling with full capacity. This can have the consequence that the user tends to intervene in the actually automated operation of the air-conditioning by means of laborious manual settings, with the consequences described above.

Figure 2:
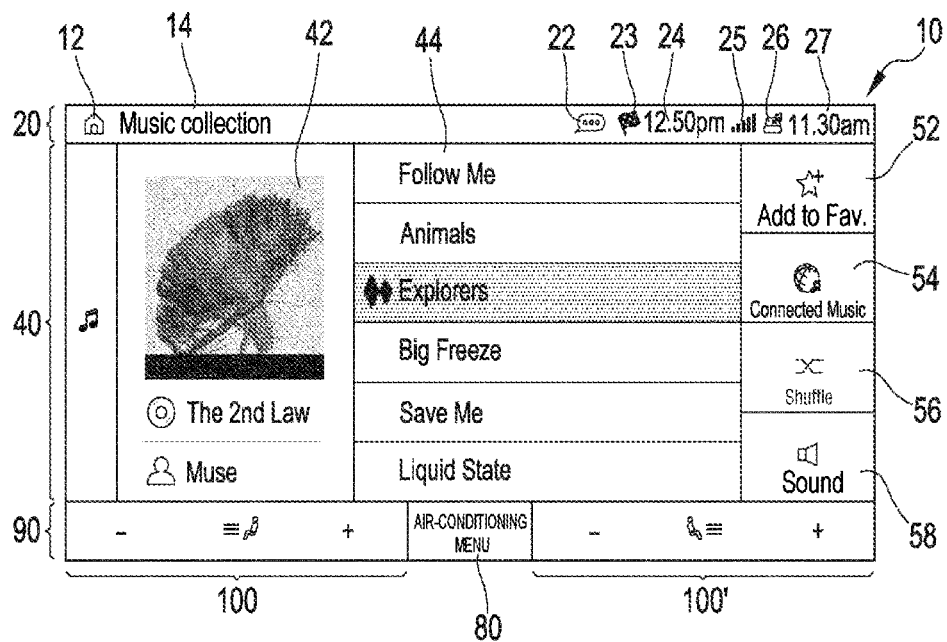
FIG. 2 shows a schematic illustration of a user interface in accordance with embodiments of the present disclosure.

FIG. 2 shows a schematic illustration of a user interface 10 in accordance with embodiments of the present disclosure. The user interface 10 can generally be subdivided into the regions 20, 40 and 90. Hereinafter the user interface may also be referred to as "CID" if the central information display is involved. Which of the possibly plurality of display units present in the vehicle displays the user interface 10 is not a crucial factor, however, in the context of the present disclosure. Provision is expressly made for displaying the user interface 10 or one or more regions 20, 40, 90 thereof flexibly on suitable display units, depending on the application or the user's desire.

The header line 20 of the user interface 10 can include various elements, for example a "home" button 12 for returning to a main menu, a title 14 for the content currently displayed in the region 40, a time display 27, elements 23 and 24 associated with navigation, elements 22 and 25 associated with communication, and further elements (e.g. 26).

The region 40 occupying the main part of the display area of the user interface 10 can be used for various purposes, for example for interacting with entertainment functions of the system, as illustrated. Additional functions possibly present and dependent on the respective context can be selected by way of the elements 52, 54, 56, 58. The region 40 is not necessary or is only optionally necessary for the setting of the air-conditioning functions.

Central elements of the air-conditioning control are displayed in the lower region 90 of the user interface 10. The display and operating elements are essentially limited to separate regions 100 and 100' for driver and passenger, which regions are moreover embodied identically, unless differences are expressly discussed in the present description. For the sake of clarity, reference is made hereinafter only to the display and operating element 100, with the express proviso that the description given is likewise valid for the display and operating element 100'. Furthermore, a switching element 80 is arranged between the display and operating elements 100, 100', said switching element allowing a second level of the user interface 10 to be called up, for less frequently used functions of the air-conditioning, or ones that concern the entire interior or all of the occupants.

FIGS. 2A to 2F show an excerpt from the schematic illustration of the user interface from FIG. 2 in accordance with embodiments of the present disclosure. Various states of the display and operating element 100 are illustrated here, which reflect corresponding various operating states of the air-conditioning.

FIG. 2A shows the arrangement of individual elements of the display and operating element 100. A display element 140 extends over the entire display and operating element 100, said display element being embodied dynamically depending on current operation parameters of the air-conditioning. That is to say that the content and/or the display of the element 140 are/is adapted to the current operation parameters at regular intervals or substantially continuously and the user can thus be given feedback about the current air-conditioning.

FIG. 2A furthermore shows display and operating elements 110 and 130, which allow the air-conditioning comfort to be reduced and increased, respectively. With the term air-conditioning comfort, the present disclosure refers to the air-conditioning comfort perceived by the user essentially in the sense of a setpoint temperature. This should be understood to mean that the term setpoint temperature should not be interpreted restrictively in the narrow literal sense, but rather encompasses the climate perceived or desired by the user in the vehicle. Although the user or the system essentially defines a setpoint temperature, the latter can be and is measured or attained thus only in very rare cases at relevant locations in the vehicle interior (e.g. footwell, centrally in the interior, or in the head region). This is the case particularly with intensive insolation, for example, when the user's temperature sensation is significantly influenced by the thermal radiation and to a lesser extent by an absolute temperature of the ambient air in the immediate surroundings in the vehicle interior. The desired air-conditioning comfort is furthermore influenced by a variety of heating and/or cooling functions, the effect of which on the user's sensation vis-à-vis air-conditioning comfort is very varied. In this regard, the heat of a seat or area heating system is perceived differently than the heating induced by warm air from the fan. A setpoint temperature is therefore compared in a suitable way with actual temperatures measured at a plurality of locations in the vehicle, such that from the comparison suitable manipulated variables for the air-conditioning (e.g. operating states for heating and/or cooling functions) are considered in order to match the setpoint temperatures to the actual temperatures on the basis of one or more functions or relations. The setpoint temperature is therefore used as a quantifiable variable for the air-conditioning comfort in the vehicle, without acting as an absolute actuator.

In this case, elements 110 and 130 each serve as a switching element, wherein a short or long touch of the element brings about a corresponding, in terms of magnitude smaller or larger reduction or increase, respectively, of the setpoint temperature. The user can thereby signal an urgency. Depending on this, the regulation can react more rapidly or more slowly to the predefinition effected by the user. With regard to signaling an urgency, an additional gesture is available to the user, described further below, in connection with element 140 and FIGS. 2A to 2F. Furthermore, elements 110 and 130 serve as display elements which, upon the attainment of a minimum temperature or maximum cooling capacity of the system (see element 164 in FIG. 2F) or upon the attainment of a maximum temperature or maximum heating capacity of the system (see element 162 in FIG. 2D), display the respective operating state or mode of the air-conditioning and unambiguously reflect that the system limits have been reached. As long as elements 110 and 130 are displayed with the symbolism "−" and "+", respectively, this indicates to the user that the air-conditioning comfort can be adjusted in the direction of colder and warmer respectively (e.g. including an increase and a reduction, respectively, of the setpoint temperature). As soon as the display of the elements 110 or 130 changes (see elements 164 and 162 in FIGS. 2F and 2D, respectively), this indicates to the user that a further reduction or increase of the setpoint temperature is no longer possible, or that the system limits have been reached and further adaptation is no longer possible.

FIG. 2A furthermore shows a display and operating element 120, which firstly allows a first additional level of the user interface 10 to be called up (see FIGS. 3A, 3B and 4B), and secondly can be enriched by detailed information (see e.g. element 1206 in FIGS. 3A, 3B, 4, 4B, 5).

An essential component in accordance with embodiments of the present disclosure is that the display and operating element 140 can comprise one or more elements 160, 162, 164 that display the respective operating state or mode of the air-conditioning, including the potential still available in the system, for example cooling and/or heating capacity still available. The underlying concept is also referred as indicator or indicator component in the present case since it allows the user to deduce the respective operating state or mode of the air-conditioning. In FIG. 2A, the display and operating element 140 is enriched by element 160. In the present case illustrated, the air-conditioning is in a state of heating up the interior, such that element 160 can be displayed with suitable coloration (e.g. intuitively in red), preferably as a color progression rising in its intensity toward the right. In this case, the position of the right-hand edge of the element 160 provides information about the heating capacity currently output by the air-conditioning, in the present case approximately 40% of a maximum heating capacity of the air-conditioning. An optional (semi) transparent display allows a clear overall display of the individual elements, optionally arranged in an overlapping manner.

Options when displaying display and operating elements include, for example, a coloration and/or color intensity of the element, wherein one or more colors of the element (e.g. change from red to blue) or the intensities thereof can be varied, a position of the element on the user interface 10, wherein the position of the element on the user interface 10 can be varied relative to one or more other elements and/or the edge of the user interface, a dimensioning of the element, wherein an element can be expanded or compressed in one or more directions and/or the size of the element can be varied, and/or a shaping of the element, wherein a pictogram and/or an inscription of the element can be varied. Further options are conceivable here.

The state of the display and operating element 140 with element 160 as illustrated in FIG. 2A can occur, on the one hand, totally without the user's assistance after the start-up of the vehicle, for example if, on account of the environmental parameters (e.g. outside temperature, interior temperature, preset setpoint temperature, etc.), the air-conditioning fully automatically instigates heating up of the interior and thus signals the heating capacity currently output. In this case, the user can recognize that the system is already working toward the desired setpoint temperature and, on account of the display represented in the display and operating element 140, the user is not led to intervene manually in the regulation, even though the desired air-conditioning comfort target (e.g. including a desired interior temperature)—purely from a sensory standpoint—is not yet present.

On the other hand, the state of the display and operating element 140 with element 160 as illustrated in FIG. 2A can occur as a consequence of assistance by the user, for instance if the user would like to adapt the air-conditioning comfort in the direction of warmer and therefore instigates this by activating the element 130 (e.g. momentarily touching or approaching it once or repeatedly). In this case, the user can recognize that the system is now working toward the new comfort target—on account of the setting effected. Momentarily in the present context means a touch or approach with a duration of up to one second.

FIGS. 2B and 2C show the same display and operating element 140 and substantially the same elements as FIG. 2A, with the difference that element 160 in FIGS. 2B and 2C has a different configuration in each case in order to mediate different operating states or modes of the air-conditioning. It is evident from FIGS. 2B and 2C that the air-conditioning proceeding from FIG. 2A is operated with a higher (heating) capacity in each case in FIG. 2B and again in FIG. 2C, this being discernible from the position of the element 160 at an increasing distance from the center. Different configurations can concern the position of an element, as shown in FIGS. 2A to 2C, but alternatively or additionally other properties of the element, for example its color and/or intensity, shaping, dimensioning, and so forth.

FIG. 2D shows a further state of the display and operating element 140. In the present case, the air-conditioning is operated with maximum capacity, such that a further manual increase of the setpoint temperature is not helpful since even a manual intervention cannot further increase the already fully summoned system capacity (here heating capacity; analogously in the case of the cooling capacity). This is signaled to the user by the element 130 being replaced by the element 162 (or a corresponding alteration of the element 130). An activation of the element 130 is thus prevented or ignored. In addition to the element 160 positioned on the far right, a suitable display of the currently maximum heating capacity, by means of the textual display "MAX HEAT" in the example illustrated, can support corresponding feedback to the user.

FIGS. 2E and 2F illustrate corresponding states of the display and operating element 140 in the case of a desired lower setpoint temperature and, associated therewith, a corresponding cooling capacity of the air-conditioning. The elements 160 and 164, respectively, are displayed in a suitable way analogously to the description given above in association with FIGS. 2A to 2D, for example the element 160 with blue coloration and, in the case of maximum cooling capacity, the element 164 including the text "MAX A/C". In the case of FIGS. 2E and 2F, the description given above in respect of the start-up of the vehicle is analogously applicable for outside temperatures which are above the desired air-conditioning comfort (i.e. outside temperatures higher than air-conditioning target or setpoint temperature) and require cooling of the interior, or upon the latter being requested by the user by activating the element 110.

With regard to all the states illustrated in FIGS. 2A to 2F, the display and operating element 140 allows a further form of the user's input in the event of particularly large deviations of the air-conditioning target from the current climate (e.g. in the event of large deviations between actual temperature and setpoint temperature). This further form of the activation of the display and operating element 140 is effected in the form of swiping (also referred to as "swipe logic"; in proximity or including touching) over the element 140, in the present case either from left to right (for the purpose of heating up) or from right to left (for the purpose of cooling down). This additional gesture (swipe) enables the user, without multiple interaction with the user interface (e.g. by increasing the intensity of the fan and reducing the setpoint temperature—where possible both by means of multiple tapping of switching elements 110 and 130), to summon the maximum heating or cooling capacity of the air-conditioning conveniently, directly or immediately. The user can thereby communicate an urgency: the predefinition by the user ought to be implemented by the air-conditioning as quickly as possible, i.e. using all available means. Swiping over the element 140 from left to right signals to the air-conditioning the user's desire for maximum heating capacity, whereupon the display changes to the display shown in FIG. 2D and the corresponding parameters for the air-conditioning are set (e.g. fan, setpoint temperature, seat heating, heating areas, steering wheel heating, etc.). Heating areas encompass heating areas integrated into the vehicle, such as, for example, ones in armrests in the doors and/or in the center console. In the example described, the gesture can be effected over the entire display and operating element 140. Alternatively, it is conceivable to realize the gesture over one or more of the elements 110, 120 and 130. In further embodiments (not shown), additional switching elements in the edge region of the display and operating element 140 (e.g. to the left of the element 110 or to the right of the element 130) can initiate a similar function.

Figure 3A:
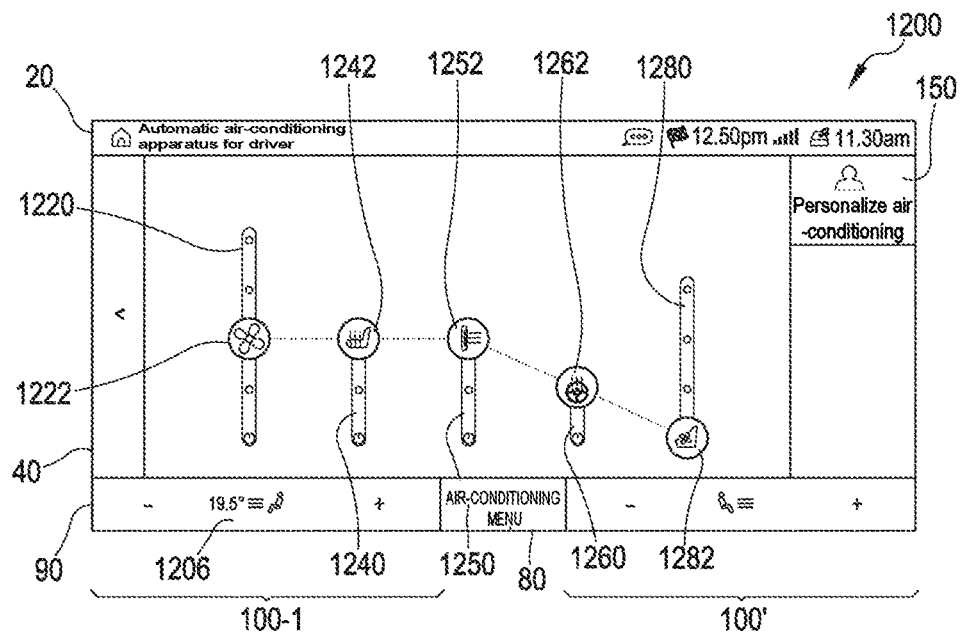
FIGS. 3A and 3B show a schematic illustration of a first additional level of the user interface in accordance with embodiments of the present disclosure.
Figure 3B:
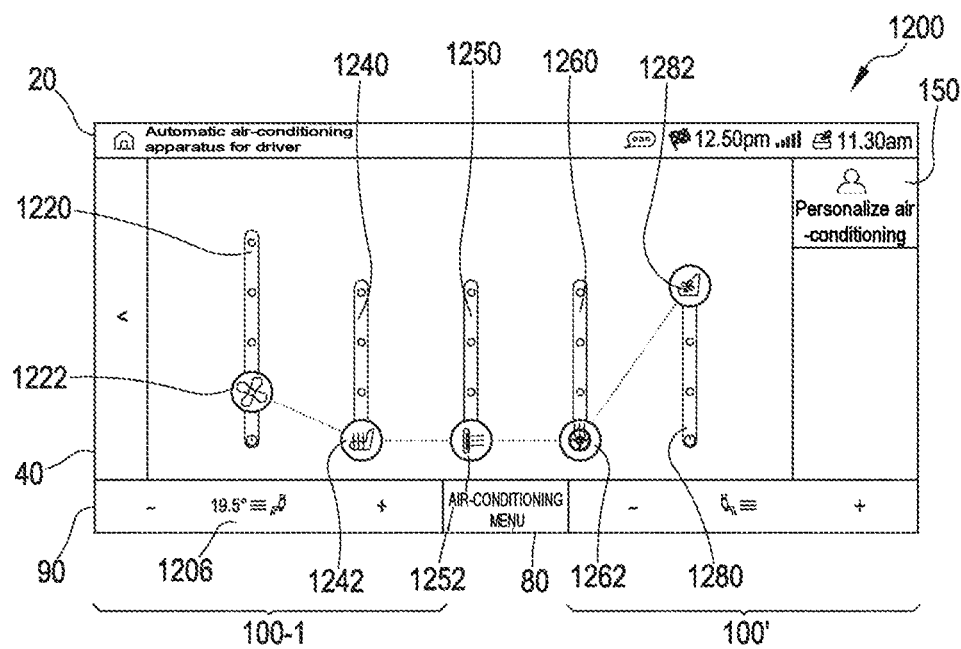

FIGS. 3A and 3B show a schematic illustration of a first additional level 1200 of the user interface 10 in accordance with embodiments of the present disclosure. Upon the activation of the element 120 (see FIGS. 2A to 2F), the user reaches the first additional level 1200 of the air-conditioning, as displayed in the region 40. All parameters relevant to the air-conditioning are taken into consideration here, wherein for example the fan 1220, 1222, the seat heating 1240, 1242, heatable areas 1250, 1252, the steering wheel heating 1260, 1262 and the seat ventilation 1280, 1282 are displayed. The respective operating elements 1222, 1242, 1252, 1262 and 1282 show the settings currently predefined by the air-conditioning and can be shifted on corresponding grids 1220, 1240, 1250, 1260, 1280 according to the user's desire. In this case, in a departure from the automated regulation, the user can manually set personal preferences with regard to the respective air-conditioning parameters. The predefinition by the user is thereupon implemented and can be taken into account in future in the automated regulation. Provision is made for such predefinitions by the user to be included in the regulation permanently in the sense of a learning system. FIG. 3A shows by way of example the system state for a user who would like to operate the ventilation components in a reduced manner, but desires a strong incorporation of the heating areas. This is evident from the fan (level 3 of 5), the seat ventilation (level 0 of 3, that is to say deactivated) and the maximum driving of the heating elements (i.e. seat heating and areas at level 3 and steering wheel heating "on").

FIG. 3A furthermore shows the adaptation of the display and operating element 120 (see FIGS. 2A to 2F), which is changed into the display 1206. In this case, a setpoint temperature, 19.5° C. in the example, on which the air-conditioning comfort is based at least indirectly can be displayed in order to give the user corresponding quantitative feedback. In principle, however, in the present case, the intention is to refrain from giving the user such quantitative information since the user's climate perception is only indirectly dependent on a simple setpoint temperature, which can or must almost be attained exactly at best in places in the interior anyway (see above). In this respect, the display of the element 1206 is preferably not effected in the basic view, but rather optionally at additional levels of the user interface 10.

By comparison therewith, FIG. 3B shows by way of example a system state with reduced fan, deactivated heating areas and maximum seat ventilation.

Figure 4:
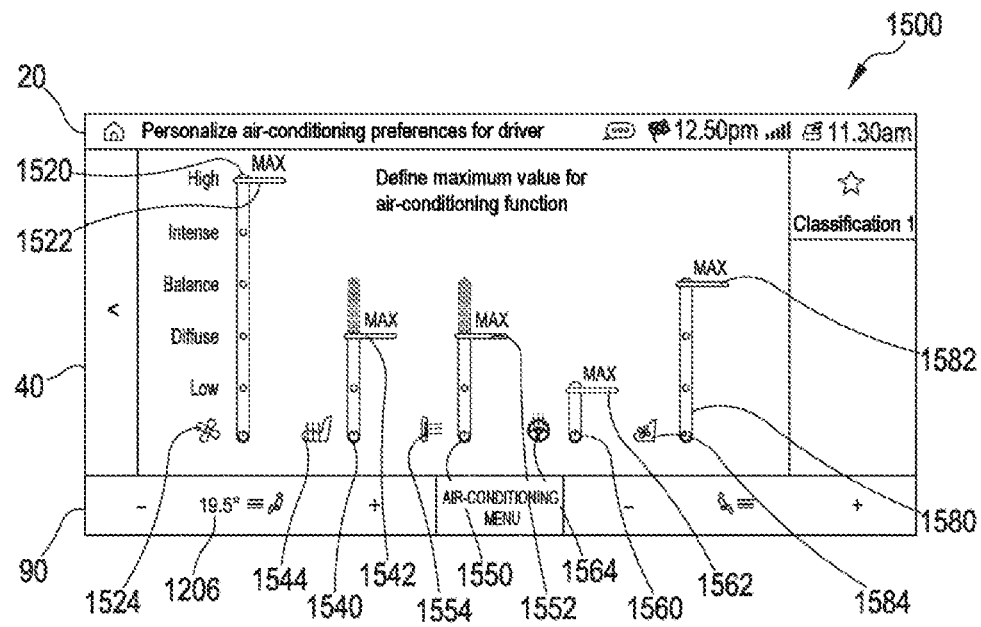
FIG. 4 shows a schematic illustration of a second additional level of the user interface in accordance with embodiments of the present disclosure.

FIG. 4 shows a schematic illustration of a second additional level 1500 of the user interface 10 in accordance with embodiments of the present disclosure. Upon the activation of the element 1500 (see FIGS. 3A and 3B), the user reaches the second additional level 1500 of the air-conditioning, as displayed in the region 40, which allows a user-specific adaptation of the individual components. This is possible by means of the predefinition of the maximum driving value or the limitation of the control range. The parameters relevant to the air-conditioning correspond to those shown in FIGS. 3A and 3B. By way of example, FIG. 4 likewise shows the fan 1520, 1522, the seat heating 1540, 1542, heatable areas 1550, 1552, the steering wheel heating 1560, 1562 and the seat ventilation 1580, 1582. The respective operating elements 1522, 1542, 1552, 1562 and 1582 with the designation "MAX" can be shifted on corresponding grids 1520, 1540, 1550, 1560, 1580 according to the user's desire. In this case, the user can set personal preferences with regard to the maximum intensity of the respective component. The values respectively set determine the maximum usable values of the respective parameter for the fully automatic air-conditioning. FIG. 4 shows by way of example possible settings by a user who would be keen to operate the ventilation components with the maximum bandwidth, evident from the maximum setting for the fan (level 5 of 5) and seat ventilation (level 3 of 3). The steering wheel heating likewise remains activatable. For the fully automatic air-conditioning this has the consequence that the fan and the seat ventilation are now activatable automatically up to the level determined by the user, in the present case maximally. In accordance with the user's settings, the seat heating and the heating areas can be activated by the fully automatic air-conditioning only up to level 2 of 3. Regardless of the limitations determined on the second level, at the first level the user can still himself/ herself effect manual adaptations that are outside the limitations determined.

Figure 4B:
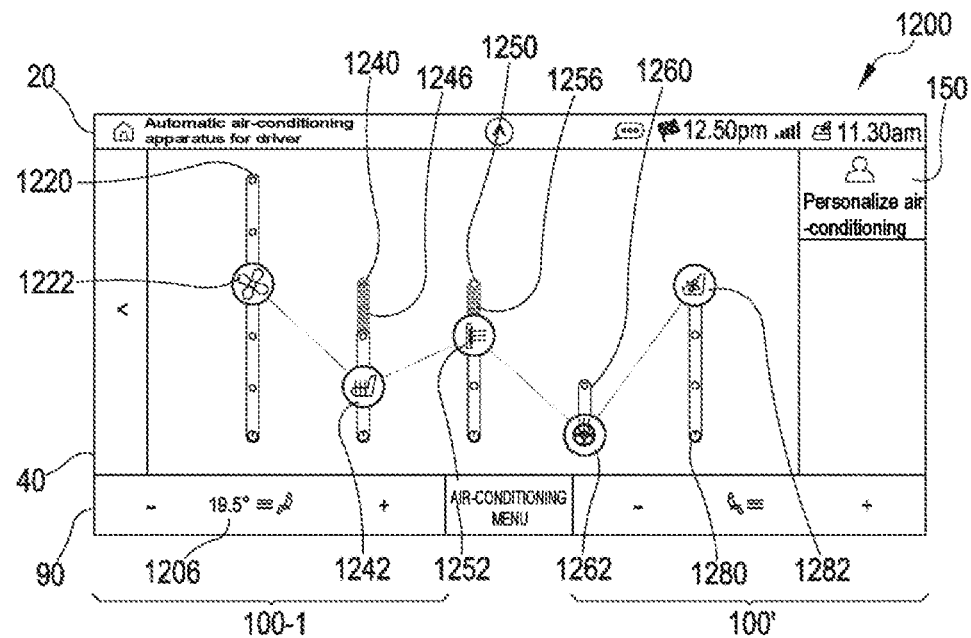
FIG. 4B shows a schematic illustration of user-defined limitations illustrated on the basis of the first additional level of the user interface in accordance with embodiments of the present disclosure.

FIG. 4B shows a schematic illustration of user-defined limitations illustrated on the basis of the first additional level 1200 of the user interface 10 in accordance with embodiments of the present disclosure. In accordance with the settings shown in FIG. 4, here a suitable display (see elements 1246, 1256 displayed in shaded manner) cause attention to what limitations have been provided by the user for the automated air-conditioning. A manual regulation outside the limitations (e.g. partial overdriving) is possible at the first level.

Figure 5:
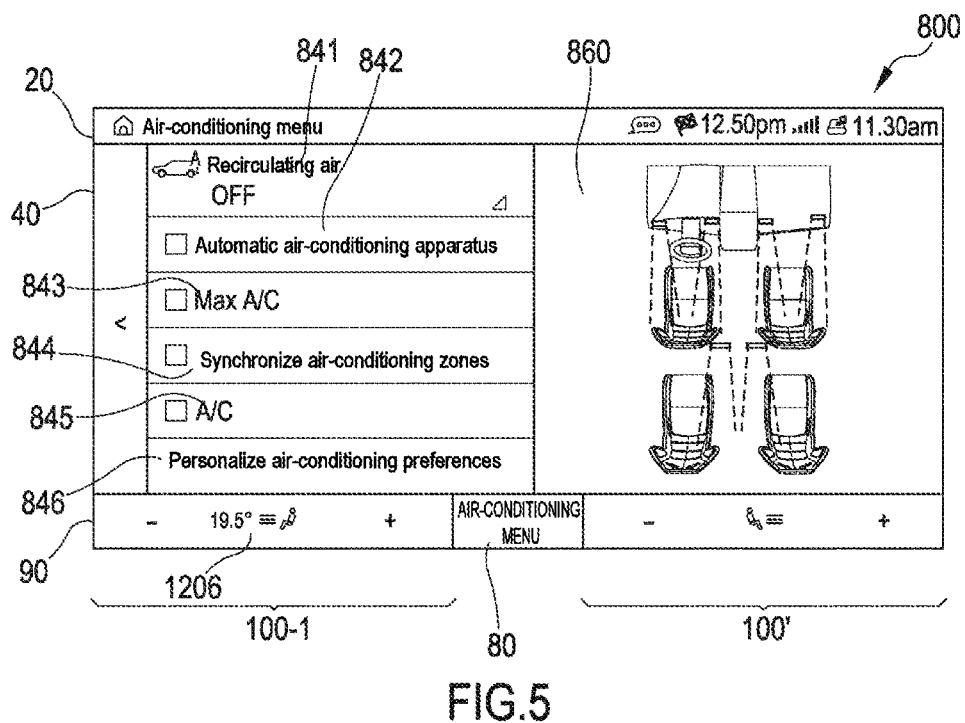
FIG. 5 shows a schematic illustration of a third additional level of the user interface in accordance with embodiments of the present disclosure.

FIG. 5 shows a schematic illustration of a third additional level 800 of the user interface 10 in accordance with embodiments of the present disclosure. Upon the activation of the element 80 (see FIGS. 3A and 3B), the user reaches the third additional level 800 of the air-conditioning, as displayed in the region 40, which contains further air-conditioning settings that largely influence the entire interior air-conditioning (e.g. A/C "on" or "off"). Furthermore, the third additional level 800 also allows central access to the air-conditioning of further rows of seats.

The following are illustrated here by way of example: recirculating air control 841, the use of the automatic air-conditioning apparatus 842, the use of the maximum cooling capacity 843, a synchronization of the air-conditioning zones 844, and the use of the air-conditioning system 845. Furthermore, specific user preferences 846 can be set. Generally, it is possible to set functions that are rarely required at this third level and optionally at further levels, inter alia so as not to overload the user interface with operating elements that are not regularly required (cf. FIG. 1). Further functions can concern the preconditioning of the vehicle, and individual aromas, and suchlike functions that usually concern the entire interior and do not take effect exclusively in the region of the driver or passenger.

Figure 6:
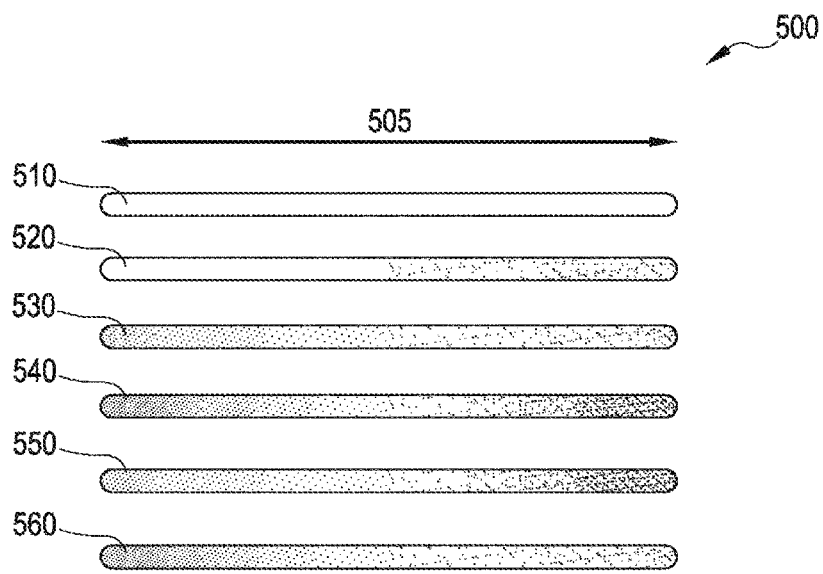
FIG. 6 shows various display options for display and operating elements in accordance with the present disclosure.

FIG. 6 shows various display options 500 for display and operating elements in accordance with the present disclosure. As described, the potential of the heating or cooling capacity of the air-conditioning depends on a number of factors. For example, it is important whether or not the engine of the vehicle is running. In electrically operated vehicles, the state of charge of the battery may be important in this regard. It is advantageous to display the respectively available potential to the user in order to produce corresponding expectations and/or to prevent manual interventions.

FIG. 6 shows by way of example various display options 510, 520, 530, 540, 550, 560, which can be used depending on an available potential 505 of the air-conditioning, for example in the display and operating elements (e.g. display and operating element 140) shown in FIGS. 2A to 2F. Display option 510 illustrates a case in which neither heating capacity nor cooling capacity is available, for example when the engine has not started in the vehicle. This can be produced by a uniform optical configuration (e.g. gray bar throughout) or by a configuration sufficiently different from other states (e.g. gray graduated bar). The absence of a corresponding coloration (e.g. an increasingly more intensive coloration proceeding from the center in blue toward the left and in red toward the right) communicates to the user that no cooling capacity (absent blue) and no heating capacity (absent red) are available. Display option 520 illustrates the case in which only heating capacity is available, for example when enough residual heat is present or when parking heating is present. In this case, this can be communicated to the user by an increasingly more intensive coloration proceeding from the center in red toward the right.

Further display options follow analogously, for example by means of different color intensities. Display option 530 communicates in contrast to display option 540, that a lower potential is available both for heating and for cooling functions. Accordingly, display option 540 communicates, in contrast to display option 530, that a greater potential is available both for heating and for cooling functions, respectively by means of a lower (see option 530) and higher (see option 540) color intensity. The situation is similar with display options 550 and 560, which communicate in the same way a lower potential for cooling and a greater potential for heating (see option 550) and, respectively, a greater potential for cooling and a lower potential for heating (see option 560).

Figure 7A:
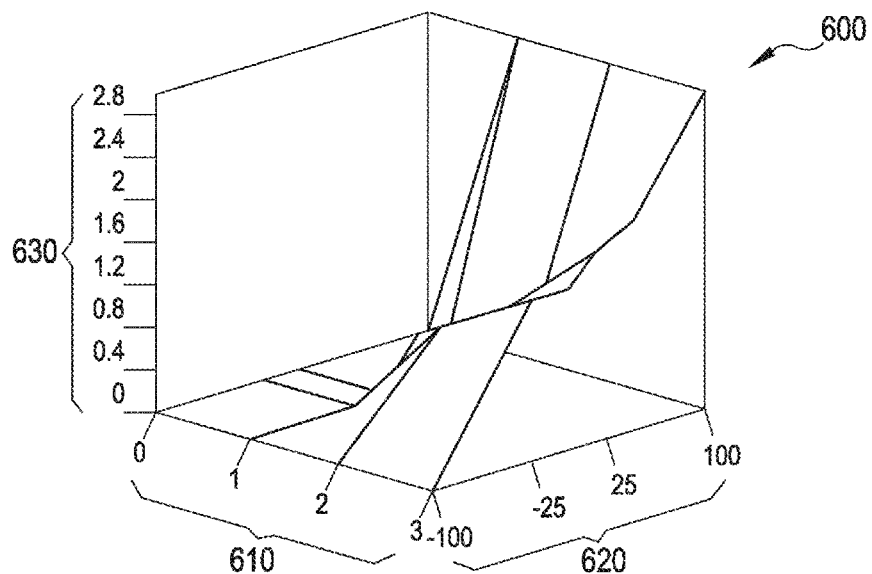
FIGS. 7A and 7B show a schematic illustration of families of characteristic curves in accordance with embodiments of the present disclosure which can find application in automated air-conditioning.
Figure 7B:
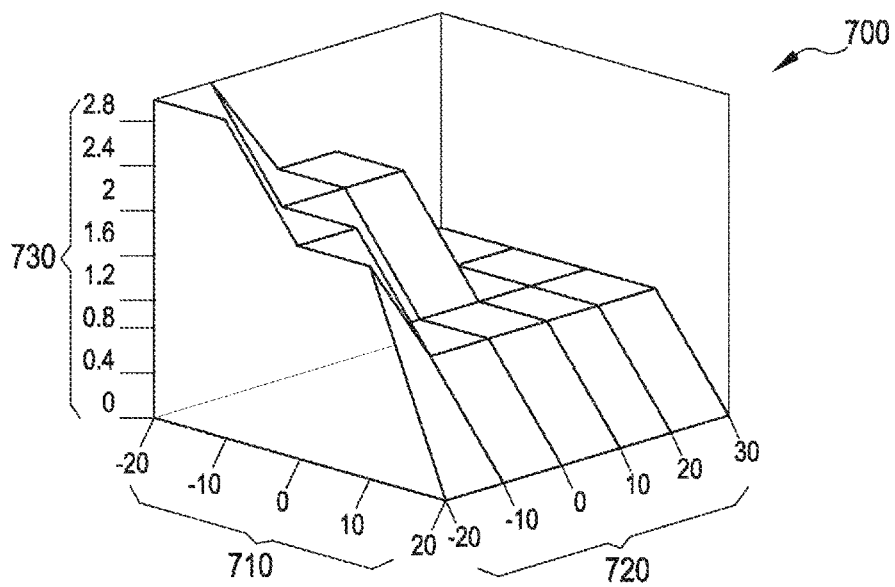

FIGS. 7A and 7B show a schematic illustration of families of characteristic curves 600, 700 in accordance with embodiments of the present disclosure which can find application in the case of automated air-conditioning. The air-conditioning is regulated on the basis of families of characteristic curves, wherein the illustrated families of characteristic curves 600, 700 are exemplary in character and serve to illustrate a regulation sequence. Generally, various environmental parameters, for example the outside temperature, the interior temperature, learned user expectation, or preset preferences, are included in the regulation of the air-conditioning.

FIG. 7A shows a family of characteristic curves 600 which allows the driving of the seat heating to be adapted to the individual user preferences, for example. The main manipulated variable for the regulation of the air-conditioning system (axis 620) and the ascertained type of user (axis 610) are used as input variables. As a result of manual interventions in the regulation, the system learns to classify the user in different categories. In this case, the value=0 means, for example, that no activation of the seat heating is desired across the entire control range. For this reason, the gain factor (axis 630) is equal to zero in this case.

FIG. 7B shows a family of characteristic curves 700 which represents the basic application of the automatic seat heating apparatus, for example. In this case the outside temperature (axis 710) and the interior temperature (axis 720) serve as input variables. The axis 730 then indicates the raw value for driving the seat heating. The result is subsequently plausibilized with the family of characteristic curves 600, as a result of which a user-specific automatic apparatus can be realized.

When a vehicle is mentioned in the present case, this is preferably a multitrack motor vehicle (automobile, truck, van). This affords a number of advantages described explicitly in the context of this document and a number of further advantages that can be understood by the person skilled in the art.

Although the invention has been more specifically illustrated and explained in detail by means of preferred exemplary embodiments, nevertheless the invention is not restricted by the examples disclosed and other variations can be derived therefrom by the person skilled in the art, without departing from the scope of protection of the invention. It is therefore clear that a large number of variation possibilities exist. It is likewise clear that embodiments mentioned by way of example actually only represent examples, which should not be interpreted in any way as a limitation of, for instance, the scope of protection, the application possibilities or the configuration of the invention. Rather, the above description and the description of the figures enable the person skilled in the art to implement the exemplary embodiments in a concrete way, wherein the person skilled in the art, with knowledge of the concept of the invention disclosed, can make diverse changes for example with regard to the function or the arrangement of individual elements mentioned in an exemplary embodiment, without departing from the scope of protection defined by the claims and the legal counterparts thereof, such as, for instance, more extensive explanations in the description.

What is claimed is:

1. A method for controlling a user interface and an air-conditioning unit of a vehicle, wherein the user interface comprises display and operating elements, the method comprising:
displaying a multiplicity of the elements on the user interface;
receiving at least two operation parameters of the air-conditioning unit;

determining one or more display parameters for a first element from the multiplicity of the elements on the basis of the at least two operation parameters;

displaying the first element on the basis of the one or more display parameters, wherein the first element indicates a remaining capacity of the air-conditioning unit for cooling or heating;

varying the one or more display parameters as the remaining capacity of the air-conditioning unit for the cooling or heating changes without requiring input from a user;

upon detecting a single swipe in a linear direction by the user in proximity to or touching the first element, setting each of the at least two operation parameters of the air-conditioning unit to provide a maximum capacity of the air-conditioning unit for the cooling or heating; and upon reaching the maximum capacity of the air-conditioning unit for the cooling or heating, preventing or ignoring an additional activation of the first element by the user.

2. The method according to claim 1, further comprising:
detecting an interaction of the user with a second element from the multiplicity of the elements;
determining a control signal on the basis of the interaction of the user;
transmitting the control signal to the air-conditioning unit.

3. The method according to claim 2, wherein the interaction of the user comprises:
a single or repeated first interaction with the second element, comprising one or more momentary approaches to or single or repeated momentary touching of the user interface in the region of the second element for a duration of up to one second;
maintaining a second interaction with the second element, comprising an approach to or tapping of the user interface in the region of the second element for a duration of more than one second; or
a third interaction with the second element by way of a relative movement of the user relative to the user interface in the region of the second element, comprising a linear relative movement of a hand or part of a hand of the user in relation to the user interface in the region of the second element, the relative movement comprising an approach to or a touch of the user interface in the region of the second element.

4. The method according to claim 1, wherein the one or more display parameters are selected from the group comprising:
a coloration and color intensity of the element;
a position of the element on the user interface;
a dimensioning of the element; and
a shaping of the element.

5. The method according to claim 1, wherein the at least two operation parameters are selected from the group comprising:
a delivery capacity of a fan;
a heating capacity of a heat exchanger for a fan;
a driving of a multiplicity of air outlets of a fan;
a heating capacity of seat heating;
a heating capacity of steering wheel heating;
a heating capacity of area heating; and
a delivery capacity of seat ventilation.

6. The method according to claim 2, wherein determining the control signal comprises:
adapting one or more operation parameters selected from the group comprising:
a delivery capacity of a fan;
a heating capacity of a heat exchanger for a fan;
a driving of a multiplicity of air outlets of a fan;
a heating capacity of seat heating;
a heating capacity of steering wheel heating;
a heating capacity of area heating; and
a delivery capacity of seat ventilation; and
determining the control signal on the basis of the adapted one or more operation parameters.

7. The method according to claim 2, wherein the first element is identical to the second element.

8. A system for a vehicle, comprising:
a control unit; and
a user interface, the user interface having display and operating elements,
wherein the control unit is configured to:
display a multiplicity of the elements on the user interface;
receive at least two operation parameters of the air-conditioning unit;
determine one or more display parameters for a first element from the multiplicity of the elements on the basis of the at least two operation parameters;
display the first element on the basis of the one or more display parameters, wherein the first element indicates a remaining capacity of the air-conditioning unit for cooling or heating;
vary the one or more display parameters as the remaining capacity of the air-conditioning unit for the cooling or heating changes without requiring input from a user;
upon detecting a single swipe in a linear direction by the user in proximity to or touching the first element, set each of the at least two operation parameters of the air-conditioning unit to provide a maximum capacity of the air-conditioning unit for the cooling or heating; and
upon reaching the maximum capacity of the air-conditioning unit for the cooling or heating, prevent or ignore an additional activation of the first element by the user.

9. The system according to claim 8, further comprising:
a display and operating unit configured to display the user interface; wherein
the display and operating unit comprises an approach- or touch-sensitive display, the approach- or touch-sensitive display comprising a touchscreen.

10. The system according to claim 9, wherein the touchscreen operates capacitively.

11. A vehicle comprising the system according to claim 9.

* * * * *